United States Patent
Nagappan et al.

(10) Patent No.: US 11,747,164 B2
(45) Date of Patent: Sep. 5, 2023

(54) METHODS FOR MULTI-DIMENSIONAL LANE MATCHING FOR AUTONOMOUS VEHICLE LOCALIZATION

(71) Applicant: GM GLOBAL TECHNOLOGY OPERATIONS LLC, Detroit, MI (US)

(72) Inventors: Meena Nagappan, Richardson, TX (US); Hyukseong Kwon, Thousand Oaks, CA (US); Joshua Lampkins, Gardena, CA (US); Rajan Bhattacharyya, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 340 days.

(21) Appl. No.: 17/147,745

(22) Filed: Jan. 13, 2021

(65) Prior Publication Data
US 2022/0221301 A1 Jul. 14, 2022

(51) Int. Cl.
*G01C 21/00* (2006.01)
*G05D 1/02* (2020.01)
(Continued)

(52) U.S. Cl.
CPC ......... *G01C 21/3819* (2020.08); *B60W 10/04* (2013.01); *B60W 10/10* (2013.01); *B60W 10/18* (2013.01); *B60W 10/20* (2013.01); *G01C 21/3833* (2020.08); *B60W 2552/05* (2020.02); *B60W 2552/30* (2020.02); *B60W 2552/53* (2020.02); *B60W 2556/40* (2020.02);
(Continued)

(58) Field of Classification Search
CPC ............ G01C 21/3819; G01C 21/3833; G01C 21/3848; G01C 21/3815; B60W 10/04; B60W 10/10; B60W 10/18; B60W 10/20; B60W 2552/05; B60W 2552/30; B60W 2552/53; B60W 2556/40; B60W 2556/45; B60W 2710/1005; B60W 2710/18; B60W 2710/20; B60W 2720/106; B60W 2720/125; B60W 60/001; B60W 2552/00; G05D 1/0212
USPC .......................................................... 701/23
See application file for complete search history.

(56) References Cited

U.S. PATENT DOCUMENTS 9,063,548 B1 * 6/2015 Ferguson ............. G06V 20/588
10,794,710 B1 * 10/2020 Liu ........................... G06T 7/73
(Continued)

*Primary Examiner* — Hunter B Lonsberry
*Assistant Examiner* — Robert Louis Pinkerton
(74) *Attorney, Agent, or Firm* — Quinn IP Law

(57) ABSTRACT

A method for updating a localization of an autonomous vehicle includes receiving perception input data from a sensor of the autonomous vehicle and receiving map data including road lane information in a vicinity of the autonomous vehicle. The method includes processing the perception input data to extract perceived road lane information including a perceived x position, a perceived y position, a perceived z position, a perceived lane type, a perceived lane color, and a perceived lane curvature and processing the map data to extract map road lane information including a map x position, a map y position, a map z position, a map lane type, a map lane color, and a map lane curvature. The method includes calculating a transformation matrix from the perceived road lane information and the map road lane information and updating the map data and a localization of the vehicle based on the transformation matrix.

3 Claims, 3 Drawing Sheets

(51) Int. Cl.
   *B60W 10/04* (2006.01)
   *B60W 10/10* (2012.01)
   *B60W 10/18* (2012.01)
   *B60W 10/20* (2006.01)

(52) U.S. Cl.
   CPC . *B60W 2556/45* (2020.02); *B60W 2710/1005* (2013.01); *B60W 2710/18* (2013.01); *B60W 2710/20* (2013.01); *B60W 2720/106* (2013.01); *B60W 2720/125* (2013.01); *G05D 1/0212* (2013.01)

(56) References Cited

U.S. PATENT DOCUMENTS

| | | | |
|---|---|---|---|
| 2019/0049957 A1* | 2/2019 | Healey | G05D 1/0066 |
| 2020/0098135 A1* | 3/2020 | Ganjineh | G06T 7/74 |
| 2020/0225673 A1* | 7/2020 | Ebrahimi Afrouzi | A47L 9/0472 |
| 2020/0232800 A1* | 7/2020 | Bai | G06T 7/38 |
| 2020/0293796 A1* | 9/2020 | Sajjadi Mohammadabadi | B60W 30/18154 |
| 2020/0310442 A1* | 10/2020 | Halder | G05D 1/0212 |
| 2020/0341466 A1* | 10/2020 | Pham | G06V 20/56 |
| 2021/0001877 A1* | 1/2021 | Han | G01C 21/3822 |
| 2021/0042929 A1* | 2/2021 | Zhao | G06N 3/08 |
| 2022/0036595 A1* | 2/2022 | Sugio | H04N 19/597 |

* cited by examiner

METHODS FOR MULTI-DIMENSIONAL LANE MATCHING FOR AUTONOMOUS VEHICLE LOCALIZATION

INTRODUCTION

The present disclosure relates generally to vehicles controlled by automated driving systems, particularly those configured to automatically control vehicle steering, acceleration, and braking during a drive cycle without human intervention.

The operation of modern vehicles is becoming more automated, i.e., able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

Embodiments according to the present disclosure provide a number of advantages. For example, embodiments according to the present disclosure enable improved vehicle localization and identification of map features using lane marking position information as well as lane color, lane type, and lane curvature.

In one aspect of the present disclosure, a method for controlling a vehicle includes receiving, by a controller, perception input data from a sensor of the vehicle and receiving, by the controller, map data including road lane information in a vicinity of the vehicle. The method includes processing, by the controller, the perception input data to extract perceived road lane information including a perceived x position, a perceived y position, a perceived z position, a perceived lane type, a perceived lane color, and a perceived lane curvature and processing, by the controller, the map data to extract map road lane information including a map x position, a map y position, a map z position, a map lane type, a map lane color, and a map lane curvature. The method further includes calculating, by the controller, a transformation matrix from the perceived road lane information and the map road lane information and generating, by the controller, a fitness score evaluating an effectiveness of the transformation matrix. The method also includes updating, by the controller, the map data and a localization of the vehicle based on the transformation matrix and generating, by the controller, a control signal to control an actuator of the vehicle.

In some aspects, the perceived lane type and the map lane type each includes one of a solid lane marking, a dashed lane marking, and a double lane marking and a lane marking integer is assigned to represent each of the solid lane marking, the dashed lane marking, and the double lane marking.

In some aspects, the perceived lane color and the map lane color each includes one of a white lane marking and a yellow lane marking, and a lane color integer is assigned to represent each of the white lane marking and the yellow lane marking.

In some aspects, the perceived lane curvature is expressed as an inverse of a radius of a perceived lane curve and the map lane curvature is expressed as an inverse of a radius of a map lane curve.

In some aspects, calculating the transformation matrix includes determining a distance d between a first sample point from the perception input data and a second sample point from the map data using an equation $$d = \sqrt{\alpha \cdot ([x\ y\ z]_P - [x\ y\ z]_M)^2 + \beta \cdot (c_P - c_M)^2 + \gamma \cdot (t_P - t_M)^2 + \delta \cdot (\kappa_P - \kappa_M)^2}$$

where $[x\ y\ z]_P$, $c_P$, $t_P$, and $\kappa_P$ are the perceived x position, perceived y position, perceived z position, perceived lane color, perceived lane type, and perceived lane curvature for a perception input data sample point;

$[x\ y\ z]_M$, $c_M$, $t_M$, and $\kappa_M$ are the map x position, map y position, map z position, map lane color, map lane type and map lane curvature for a map data sample point; and $\alpha, \beta, \gamma$, and $\delta$ are corresponding weight factors.

In some aspects, the weight factors are adjusted such that a minimal distance between a perception input data point for a lane and a map data point for the lane is found.

In some aspects, processing the perception data includes generating a perception input data cloud and processing the map data includes generating a map data cloud.

In some aspects, the fitness score is a sum of squared distances from the perception input data cloud to the map data cloud.

In another aspect of the present disclosure, an automotive vehicle includes a sensor configured to generate perception input data regarding a vicinity of the automotive vehicle, an actuator configured to control vehicle steering, acceleration, braking, or shifting, and at least one controller in electronic communication with the sensor and the actuator. The at least one controller is programmed with an automated driving system control algorithm and is configured to automatically control the actuator based on the automated driving system control algorithm. The automated driving control system algorithm includes a perception system configured to receive the perception input data from the sensor and extract perceived road lane information including a perceived x position, a perceived y position, a perceived z position, a perceived lane type, a perceived lane color, and a perceived lane curvature. The automatic driving control system algorithm also includes a localization and mapping module configured to generate map data and extract map road lane information including a map x position, a map y position, a map z position, a map lane type, a map lane color, and a map lane curvature and a lane matching module configured to calculate a transformation matrix from the perceived road lane information and the map road lane information, generate a fitness score evaluating an effectiveness of the transformation matrix, and update the map data and a localization of the vehicle based on the transformation matrix. The automatic driving control system algorithm also includes a vehicle control module configured to generate a control signal for the automotive vehicle. The at least one controller is further programmed to control the actuator according to the control signal.

In some aspects, the perceived lane type and the map lane type each includes one of a solid lane marking, a dashed lane marking, and a double lane marking and a lane marking integer is assigned to represent each of the solid lane marking, the dashed lane marking, and the double lane marking.

In some aspects, the perceived lane color and the map lane color each includes one of a white lane marking and a yellow lane marking, and a lane color integer is assigned to represent each of the white lane marking and the yellow lane marking.

In some aspects, the perceived lane curvature is expressed as an inverse of a radius of a perceived lane curve and the map lane curvature is expressed as an inverse of a radius of a map lane curve.

In some aspects, extracting the perceived road lane information includes generating a perception input data cloud and extracting the map road lane information includes generating a map data cloud.

In some aspects, the fitness score is a sum of squared distances from the perception input data cloud to the map data cloud.

In another aspect of the present disclosure, a method for multi-dimensional lane matching for updating a localization of an autonomous vehicle includes receiving, by a controller, perception input data from a sensor of the autonomous vehicle and receiving, by the controller, map data including road lane information in a vicinity of the autonomous vehicle. The method further includes processing, by the controller, the perception input data to extract perceived road lane information including a perceived x position, a perceived y position, a perceived z position, a perceived lane type, a perceived lane color, and a perceived lane curvature and processing, by the controller, the map data to extract map road lane information including a map x position, a map y position, a map z position, a map lane type, a map lane color, and a map lane curvature. The method also includes calculating, by the controller, a transformation matrix from the perceived road lane information and the map road lane information and updating, by the controller, the map data and a localization of the vehicle based on the transformation matrix.

In some aspects, the method further includes generating, by the controller, a fitness score evaluating an effectiveness of the transformation matrix.

In some aspects, the perceived lane type and the map lane type each includes one of a solid lane marking, a dashed lane marking, and a double lane marking and a lane marking integer is assigned to represent each of the solid lane marking, the dashed lane marking, and the double lane marking.

In some aspects, the perceived lane color and the map lane color each includes one of a white lane marking and a yellow lane marking, and a lane color integer is assigned to represent each of the white lane marking and the yellow lane marking.

In some aspects, the perceived lane curvature is expressed as an inverse of a radius of a perceived lane curve and the map lane curvature is expressed as an inverse of a radius of a map lane curve.

In some aspects, calculating the transformation matrix includes determining a distance d between a first sample point from the perception input data and a second sample point from the map data using an equation $$d = \sqrt{\alpha \cdot ([x\ y\ z]_P - [x\ y\ z]_M)^2 + \beta \cdot (c_P - c_M)^2 + \gamma \cdot (t_P - t_M)^2 + \delta \cdot (\kappa_P - \kappa_M)^2}$$

where $[x\ y\ z]_P$, $c_P$, $t_P$, and $\kappa_P$ are the perceived x position, perceived y position, perceived z position, perceived lane color, perceived lane type, and perceived lane curvature for a perception input data sample point;

$[x\ y\ z]_M$, $c_M$, $t_M$, $\kappa_M$ are the map x position, map y position, map z position, map lane color, map lane type and map lane curvature for a map data sample point; and $\alpha, \beta, \gamma$, and $\delta$ are corresponding weight factors.

BRIEF DESCRIPTION OF THE DRAWINGS

The present disclosure will be described in conjunction with the following figures, wherein like numerals denote like elements.

Figure 1:
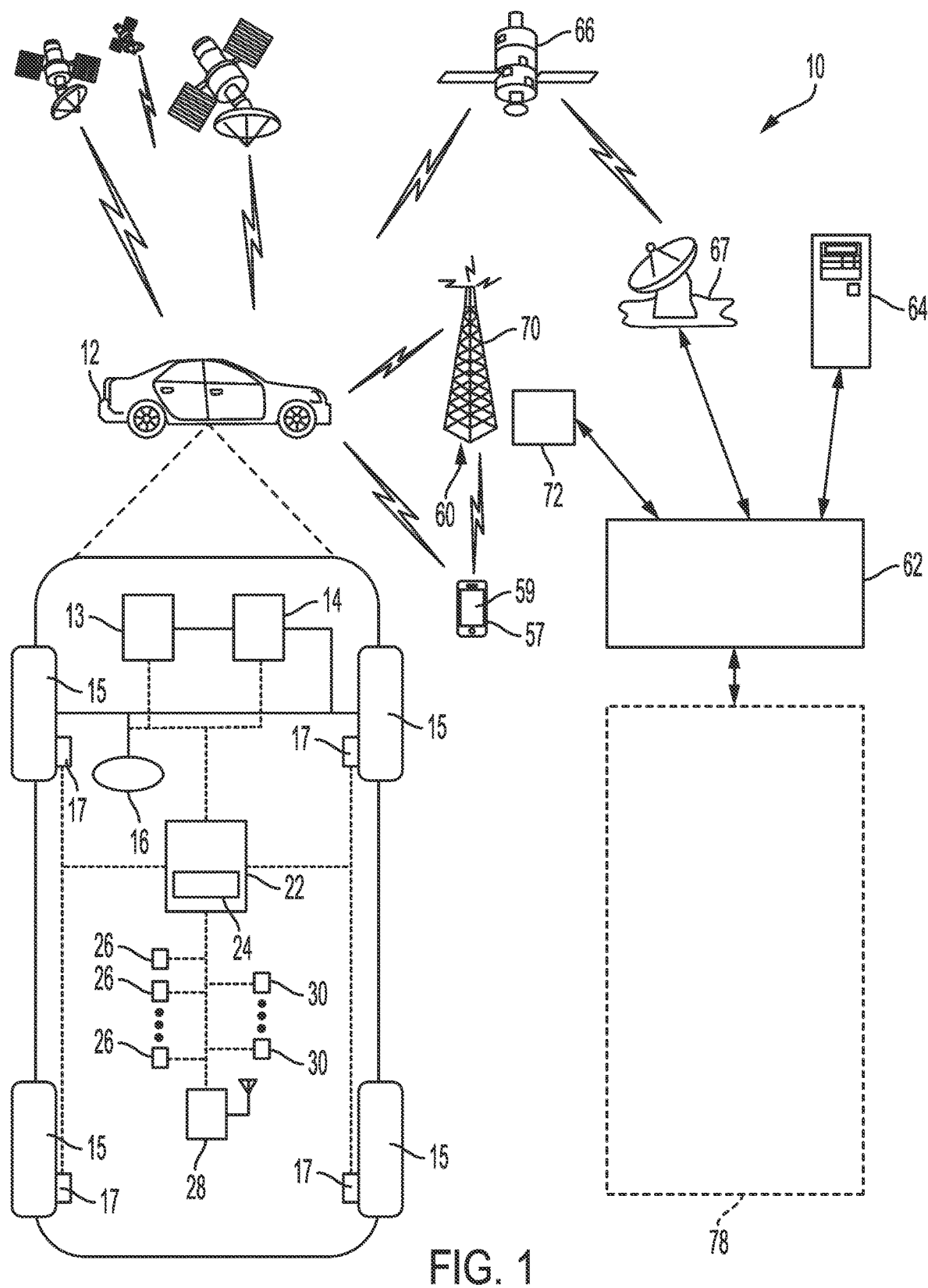
FIG. 1 is a schematic diagram of a communication system including an autonomously controlled vehicle according to an embodiment of the present disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 schematically illustrates an operating environment that includes a mobile vehicle communication and control system 10 for a motor vehicle 12. The communication and control system 10 for the vehicle 12 generally includes one or more wireless carrier systems 60, a land communications network 62, a computer 64, a mobile device 57 such as a smart phone, and a remote access center 78.

The vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The vehicle 12 includes a propulsion system 13, which may in various embodiments include an internal combustion engine, an electric machine such as a traction motor, and/or a fuel cell propulsion system.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission.

The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the mobile device 57. The mobile device 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving GPS satellite signals and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62 but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12. The computer 64 may be in communication with at least one supplemental vehicle in addition to the vehicle 12. The vehicle 12 and any supplemental vehicles may be collectively referred to as a fleet.

Figure 2:
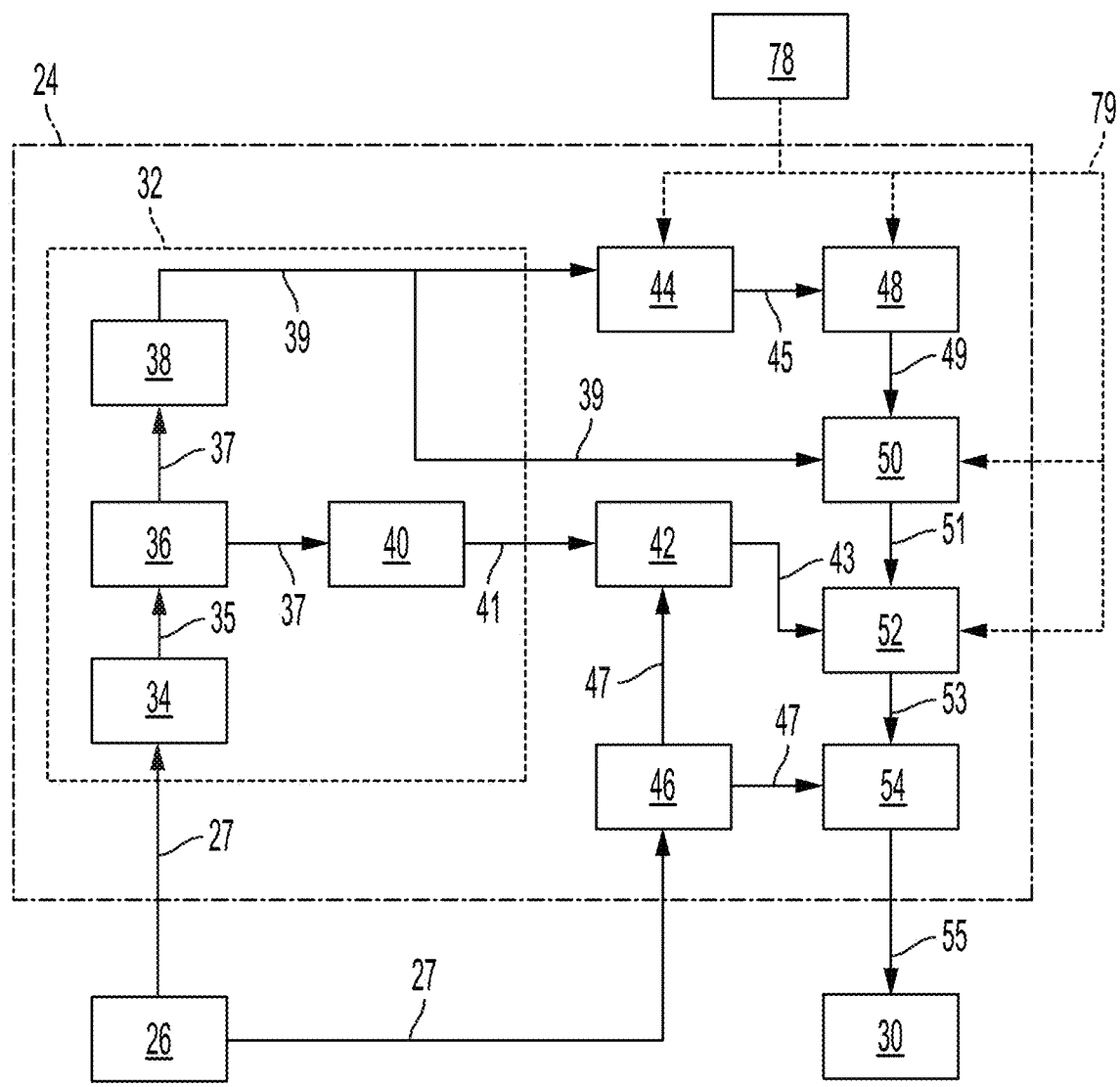
FIG. 2 is a schematic block diagram of an automated driving system (ADS) for a vehicle according to an embodiment of the present disclosure.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

The present disclosure identifies the lane markings of all of the lanes in front of the vehicle 12, which can then be used to extract the current lane of travel of the vehicle 12. Additionally, the methods and systems disclosed herein include not just lane marking position information but also three additional lane features—lane color, lane type, and lane curvature—to match lane markings more robustly and provide an updated vehicle localization. The methods and systems disclosed herein present a matching algorithm that matches two sets of lane markings by considering the type of lane (i.e., x position, y position, z position in a typical xyz Cartesian reference frame, lane color, lane type, and lane curvature) to generate a transformation matrix and a fitness score. The fitness score is a confidence score for the estimated transformation matrix. The transformation matrix is applied to the set of lane markings, allowing an automated driving system of the autonomous vehicle to correctly match road features, correct the vehicle localization, and provide a more accurate localization reference for making path planning decisions.

Figure 3:
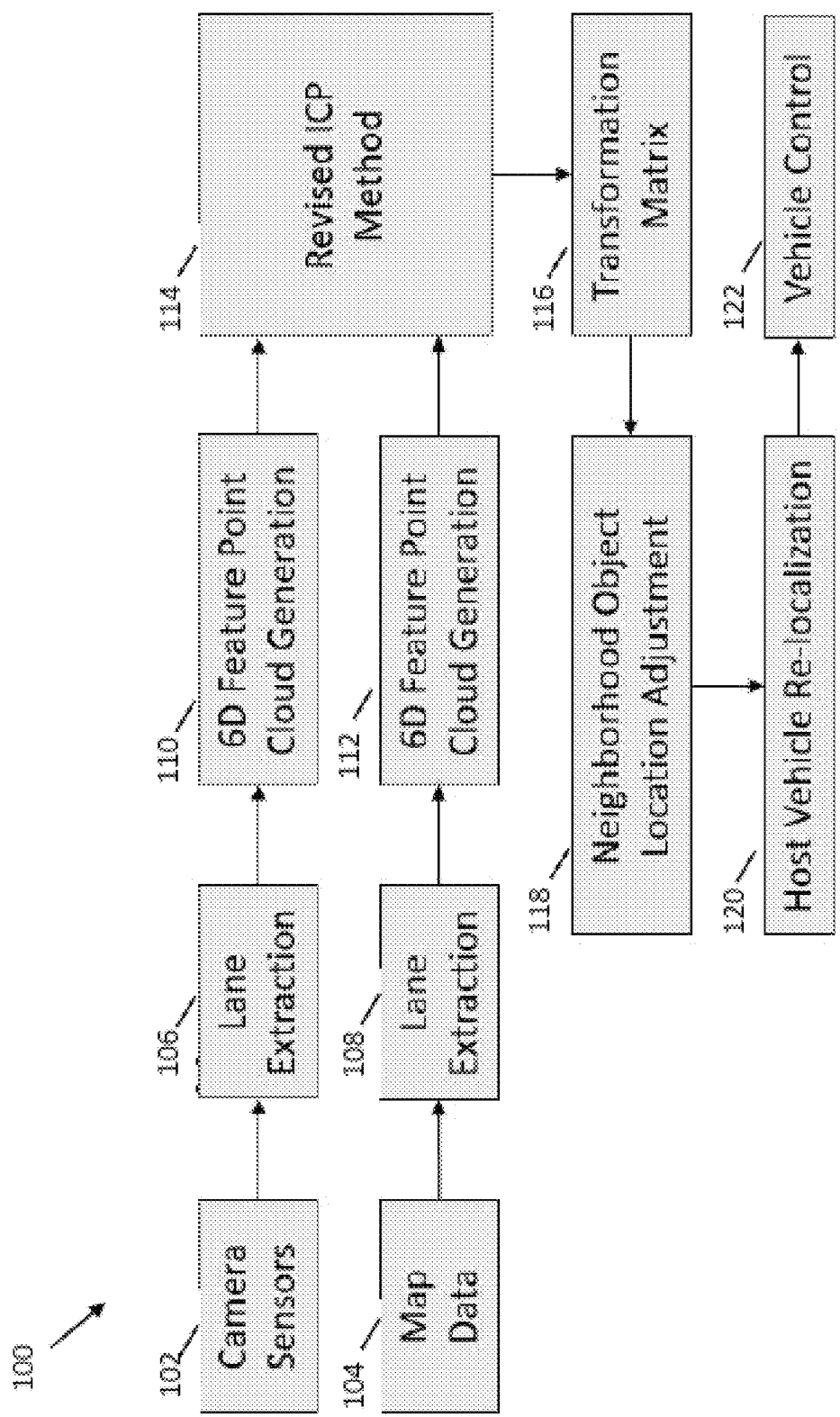
FIG. 3 is a high level flow diagram of a method for multi-dimensional lane matching, according to an embodiment of the present disclosure.

FIG. 3 illustrates a method 100 to match two sets of lane markings by considering the unique types of lanes encountered by the vehicle 12 (i.e., dashed, color, curvature), along with sample point locations to correct map features through perception and produce more accurate vehicle localizations. The method 100 can be utilized in connection with the vehicle 12 and the various modules of the ADS 24 discussed herein. The method 100 can be utilized in connection with the controller 22 as discussed herein, or by other systems associated with or separate from the vehicle, in accordance with exemplary embodiments. The order of operation of the method 100 is not limited to the sequential execution as illustrated in FIG. 3, but may be performed in one or more varying orders, or steps may be performed simultaneously, as applicable in accordance with the present disclosure.

At a high level, FIG. 3 illustrates how the method 100 describing a lane matching algorithm is used in an autonomous vehicle application. With perception data and map data as inputs, the lane matching algorithm provides information that is used to improve path planning for the vehicle 12. Data is collected from the vehicle sensors, such as sensors 26 of the perception system 32, and the pre-acquired map information, such as GPS data, as shown by blocks 102 and 104. The sensor data and map information is then processed using lane detecting algorithms, such as by the localization and mapping module 40, as shown by blocks 106 and 108.

The two data sets illustrated by blocks 106 and 108 are then fed as inputs into a multi-dimensional lane matching algorithm of the ADS 24 and organized into the proposed multi-dimensional point cloud formats, as shown by blocks 110 and 112. From there, the data is processed by a Weighted Iterative Closest Points (ICP) algorithm of the ADS 24, illustrated by block 114. The ICP algorithm generates a transformation matrix, illustrated by block 116, that allows one set of data to be transformed into the other, and a fitness score is calculated as a measure of how well the transformation matrix works.

Next, as illustrated by blocks 118 and 120, both the transformation matrix and the fitness score are used by the ADS 24 for re-localizing any neighboring vehicles and/or objects and updating the location of the vehicle 12. Based on the updated localization information, the vehicle 12 is controlled by the ADS 24, as shown by block 122.

To increase the accuracy and robustness of the lane matching algorithm 100, the following feature vectors are used as inputs to the modified ICP algorithm. The feature vectors include the three-dimensional position of the lane (x position, y position, and z position), the lane color (white, yellow, etc.), the lane type (solid, dashed, double, etc.), and the lane curvature (mapped to a definite range). Each feature vector is extracted from a sample point of the lane segments. Sampling intervals from the perception, or sensor, data and the map data are the same to effectively use the ICP algorithm.

Lane color is typically limited to a number of variations (white, yellow, etc.), so an integer is assigned to each color. Similarly, lane type also has a limited number of variations (solid, dashed, double, etc.), and a separate integer is assigned to each lane type.

The lane curvature is defined as an inverse of the radius of the curve. So, the value can be distributed from a small number (indicative of a very sharp curve) to infinity (indicative of a straight lane). To use this value appropriately in the ICP algorithm, the lane curvature is mapped to a predetermined fixed number range.

The lane extraction data from the perception inputs (sensors 26) and the map data is formatted as two point clouds—a perception cloud and a map cloud—for use in the ICP algorithm. The lane extraction algorithms return two sets of points, one for perception data and another for map data, shown as blocks 106 and 108. Each data set includes six pieces of information: x location, y location, z location, lane color, lane type, and lane curvature.

Once the data has been arranged into two sets of point clouds, the ADS 24 analyzes the data using an ICP algorithm to calculate the transformation matrix, as shown in block 114. In this analysis, the ADS 24 determines the closest point in the target point cloud to the source point cloud and calculates the rotation and translation required to achieve that transform. The distance d between a first sample point from the perception data and a second sample point from the map data is defined in a weighted way:

$$d = \sqrt{\alpha \cdot ([x \ y \ z]_P - [x \ y \ z]_M)^2 + \beta \cdot (c_P - c_M)^2 + \gamma \cdot (t_P - t_M)^2 + \delta \cdot (\kappa_P - \kappa_M)^2}$$

Where $[x \ y \ z]_P$, $c_P$, $t_P$, and $\kappa_P$ are the x, y, z location, lane color, lane type and lane curvature for a perception sample point, respectively;

$[x \ y]_M$, $c_M$, $t_M$, and $\kappa_M$ are the x, y, z location, lane color, lane type and lane curvature for a map sample point, respectively; and $\alpha, \beta, \gamma$, and $\delta$ are the corresponding weight factors for each of the location, lane color, lane type, and lane curvature components. The weight factors are adjusted so that when the lane matching algorithm illustrated by method 100 computes the distance between a sample point from the perception cloud and a sample point from the map cloud, the minimal distance between points that are in the same lane are found, not the minimal distance between any point. During the analysis of the data shown in block 114, outliers are rejected or inliers are given a greater weight via a random sample concurrence algorithm or RANSAC. The output of the ICP algorithm is the transformation matrix of block 116, as well as the fitness score, which is a sum of squared distances from the perception cloud to the map cloud.

With the acquired transformation matrix, the locations of lanes, other objects (vehicles, pedestrians, etc.), and the vehicle 12 are adjusted accordingly, as shown at block 118. Consequentially, this allows the ADS 24 of the vehicle 12 to adjust the vehicle's location within the lanes and allows a more accurate sense of location of the vehicle 12 when the ADS 24 and the controller 22 perform tasks such as generating one or more control signals for changing lanes or making turns. To summarize, the lane matching algorithm illustrated by method 100 provides a more accurate localization of surrounding vehicles, objects, pedestrians, etc. and the vehicle 12 for more robust vehicle control.

It should be emphasized that many variations and modifications may be made to the herein-described embodiments, the elements of which are to be understood as being among other acceptable examples. All such modifications and variations are intended to be included herein within the scope of this disclosure and protected by the following, claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a vehicle, comprising:
   receiving, by a controller, perception input data from a sensor of the vehicle;
   receiving, by the controller, map data including road lane information in a vicinity of the vehicle;
   processing, by the controller, the perception input data to extract perceived road lane information including a perceived x position, a perceived y position, a perceived z position, a perceived lane type, a perceived lane color, and a perceived lane curvature;
   processing, by the controller, the map data to extract map road lane information including a map x position, a map y position, a map z position, a map lane type, a map lane color, and a map lane curvature;
   calculating, by the controller, a transformation matrix from the perceived road lane information, including perceived x position, perceived y position, perceived z position, perceived lane type, perceived lane color, and perceived lane curvature, and the map road lane information, including perceived x position, perceived y position, perceived z position, perceived lane type, perceived lane color, and perceived lane curvature;
   generating, by the controller, a fitness score evaluating an effectiveness of the transformation matrix;
   updating, by the controller, the map data and a localization of the vehicle based on the transformation matrix; and
   generating, by the controller, a control signal to control an actuator of the vehicle;
   wherein calculating the transformation matrix comprises determining a distance d between a first sample point from the perception input data and a second sample point from the map data using an equation $$d = \sqrt{\alpha \cdot ([x \ y \ z]_P - [x \ y \ z]_M)^2 + \beta \cdot (c_P - c_M)^2 + \gamma \cdot (t_P - t_M)^2 + \delta \cdot (\kappa_P - \kappa_M)^2}$$

where $[x \ y \ z]_P$, $c_P$, $t_P$, and $\kappa_P$ are the perceived x position, perceived y position, perceived z position, perceived lane color, perceived lane type, and perceived lane curvature for a perception input data sample point;
$[x \ y \ z]_M$, $c_M$, $t_M$, $\kappa_M$ are the map x position, map y position, map z position, map lane color, map lane type and map lane curvature for a map data sample point; and
$\alpha, \beta, \gamma$, and $\delta$ are corresponding weight factors.

2. The method of claim 1, wherein the weight factors are adjusted such that a minimal distance between a perception input data point for a lane and a map data point for the lane is found.

3. A method for multi-dimensional lane matching for updating a localization of an autonomous vehicle, comprising:
   receiving, by a controller, perception input data from a sensor of the autonomous vehicle;
   receiving, by the controller, map data including road lane information in a vicinity of the autonomous vehicle;
   processing, by the controller, the perception input data to extract perceived road lane information including a perceived x position, a perceived y position, a perceived z position, a perceived lane type, a perceived lane color, and a perceived lane curvature;
   processing, by the controller, the map data to extract map road lane information including a map x position, a map y position, a map z position, a map lane type, a map lane color, and a map lane curvature;
   calculating, by the controller, a transformation matrix from the perceived road lane information, including perceived x position, perceived y position, perceived z position, perceived lane type, perceived lane color, and perceived lane curvature, and the map road lane information, including perceived x position, perceived y position, perceived z position, perceived lane type, perceived lane color, and perceived lane curvature; and updating, by the controller, the map data and a localization of the vehicle based on the transformation matrix;

wherein calculating the transformation matrix comprises determining a distance d between a first sample point from the perception input data and a second sample point from the map data using an equation $$d = \sqrt{\alpha \cdot ([xyz]_P - [xyz]_M)^2 + \beta \cdot (c_P - c_M)^2 + \gamma \cdot (t_P - t_M)^2 + \delta \cdot (\kappa_P - \kappa_M)^2}$$

where $[x\ y\ z]_P$, $c_P$, $t_P$, and $\kappa_P$ are the perceived x position, perceived y position, perceived z position, perceived lane color, perceived lane type, and perceived lane curvature for a perception input data sample point;

$[x\ y\ z]_M$, $c_M$, $t_M$, $\kappa_M$ are the map x position, map y position, map z position, map lane color, map lane type and map lane curvature for a map data sample point; and $\alpha, \beta, \gamma$, and $\delta$ are corresponding weight factors.

* * * * *